April 6, 1926.  
C. G. READ  
1,579,659  
KNOCKDOWN BED  
Filed August 26, 1922
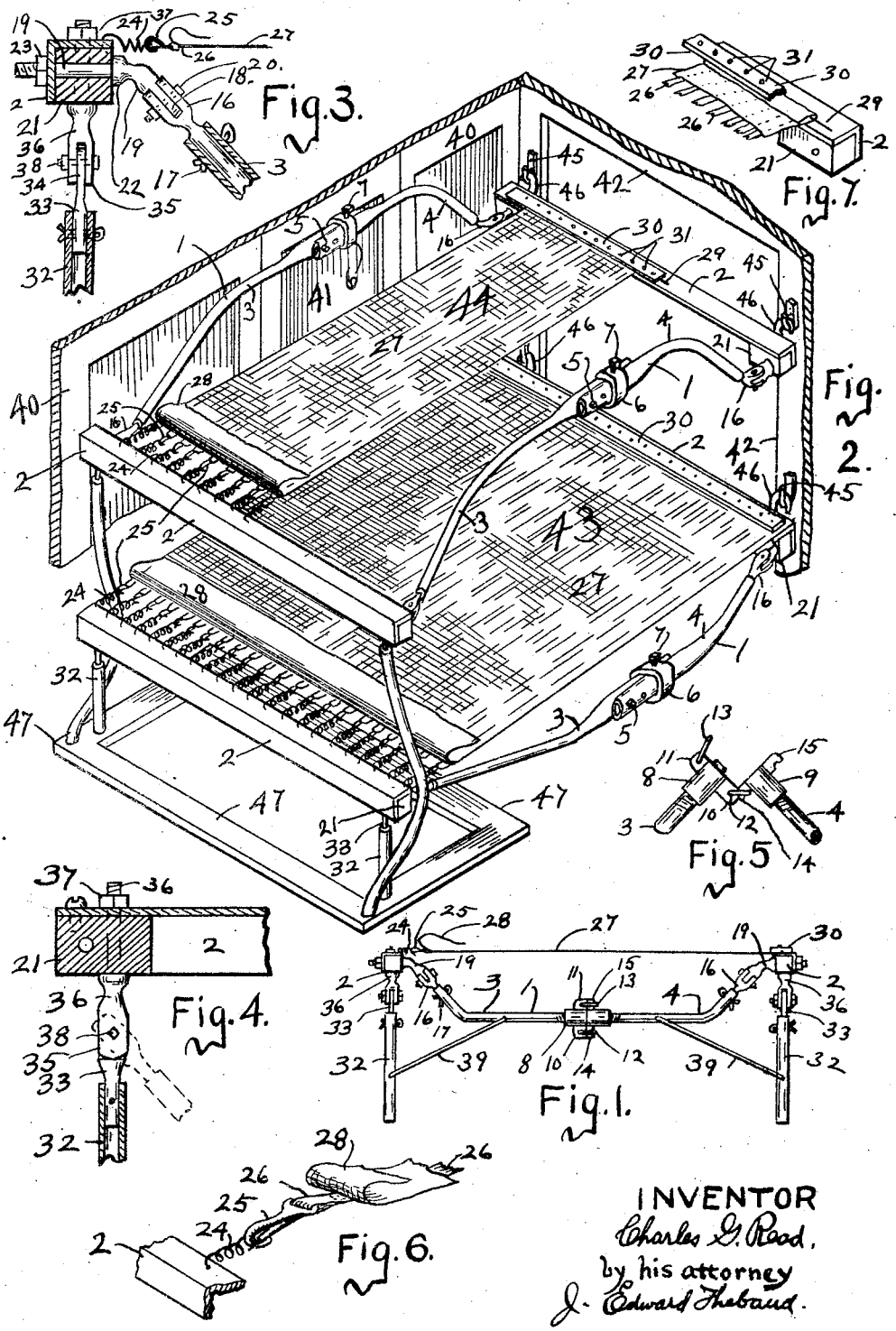
INVENTOR  
Charles G. Read,  
by his attorney  
J. Edward Thebaud.

Patented Apr. 6, 1926.

1,579,659

UNITED STATES PATENT OFFICE.

CHARLES G. READ, OF BUFFALO, NEW YORK.

KNOCKDOWN BED.

Application filed August 26, 1922. Serial No. 584,417.

*To all whom it may concern:*

Be it known that I, CHARLES G. READ, a citizen of the United States, residing at Buffalo, in the county of Erie and State of New York, have invented certain new and useful Improvements in Knockdown Beds; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to knock-down beds, particularly to that class thereof which are adapted for use in a closed automobile, such as a limousine or a sedan.

One of the objects of this invention is to provide a bed of such a construction as to fit into the peculiarly formed spaced in a closed automobile, available above the seats for the purpose; making as slight modifications as possible to the interior of the car to provide for the installation of the bed or beds.

Another object of this invention is to provide a bed which is both adapted for use in either a car or a tent.

Another object of this invention is to provide a knock-down bed having separable sections and having parts of each section pivotally joined together, permitting of folding the same together to occupy a small space for carrying.

A further object is to provide a bed having the webbing or mattress support reinforced in a manner to give flexibility for rolling the same up to be carried.

Another object is to provide means, as hooks between the webbing and the end cross piece of the bed whereby one end of the webbing or mattress support may be detached to facilitate wrapping up the bed in a knockdown condition.

A further object is to provide knock-down beds of such construction as are suitable to an arrangement within a closed automobile to afford an upper and a lower berth, at the same time making the upper berth accessible, also having the construction such as not to interfere with accessibility through doors of the automobile into the beds, within the confined space available.

With these and other objects, my invention resides in certain construction of beds and their arrangement within a closed automobile, such as are illustrated in the drawings and hereinafter described and claimed.

In the drawings,

Figure 1 is a side elevation of a separable or knock-down bed embodying my invention.

Figure 2 is a perspective view showing beds similar in construction to that shown in Figure 1, but here shown arranged to form an upper and a lower berth within a closed car, part of the walls and frame of which is fragmentarily shown.

Figure 3 is a sectional end elevation of an end cross piece of the bed shown in Figure 1. The figure includes pivotal joints used in connection with the legs and the side rails of the bed.

Figure 4 is a sectional inside elevation of an end of one of the cross pieces.

Figure 5 is a modified form of joint for the side rails.

Figure 6 is a perspective view of a fragment of the webbing showing the same releasably attached by a hook to a spring and end cross piece of bed.

Figure 7 is a perspective view of a fragment of the webbing at the opposite end of the bed showing manner of attaching permanently to end cross piece.

In the figures, the frame of the bed is shown to include side rails 1, preferably made of pipe, which are bent to be clear of the level of the end pieces 2. When turned down, the side rails remain clear of the sag in the webbing when the bed is occupied. The side rails 1 are preferably made in two pieces 3 and 4, joined together. This facilitates the tensioning of the springs and the webbing, as well as permitting of packing the bed in a smaller space when taken apart. A bolt 5 binds together the end of the piece 3 to the flat side of the piece 4, while the end of the piece 4 is held against the flat side of the piece 3, within the ring or clamp 6, fixed thereon by the set screw 7. As a modification of the joint between the pieces just described, there is shown in Figures 1 and 5, a joint connecting the pieces 3 and 4, which pieces are here shown as pipe without flat ends. The joint is made up of two cylindrical parts 8 and 9, screwed respectively to the rail pieces 3 and 4. If the threads are right and left on a turn buckle, then a longitudinal adjustment can be made while the joint is closed. The part 8 has two ears 10 and 11 through which pass the respective links 12 and 13. The part 9 has ears 14, and 15 for releasable engagement with the links 12 and 13 respectively. The outer ends of the pieces 3 and 4 are each engaged by a joint stem 16, fixed therein by the cotter pins 17, (see Figure 3). The outer end of the stem 16 is bifurcated and is engaged by the flat end 18 of the joint stem 19, and turns on the bolt 20. The stem 19 is bent and passes through the block 21, fixed within the end of the angle iron forming one of the cross pieces 2. The stem 19 has a shoulder 22. A nut 23 fixes the stem 19 upon the block 21 and the cross piece 2. Springs 24 engage the cross pieces 2 and each spring is releasably held by a snap hook 25, fixed to end of a tape 26, sewed to a canvas webbing 27, to strengthen the same. One end 28, of the canvas webbing 27, extends beyond the tapes 26 and is shown laid back to expose the springs 24 and hooks 25. In use, the end 28 is laid over to cover the springs 25, under a mattress, laid upon the webbing 27. The oposite end of the webbing is hemmed and has a wire or rod 29 passing through the hem. This lays on the cross bar 2 and over it is the flat metallic strip 30 riveted or screwed to the cross bar 2 back of the rod 29, having the rod 29 under but outside the rivets or screws 31.

The legs 32 of the beds are of pipe, each having fixed in its upper end a stem 33, which has a flat portion 34 engaging the bifurcated flat portion 35 of the stem 36, which passes through a vertical hole in the block 21 and is fixed thereto by the nuts 37. A bolt 38 forms the pivot of the joint. Braces 39 for the legs 32 may be provided, as in Figure 1, and may be detachable from either or both the legs 32 and the side rails 1.

Considering now the arrangement of the beds shown in Figure 2, to form upper and lower berths within the car, fragments of a car side wall 40, with a door 41, and a front or windshield wall 42 are shown. The lower bed 43 extends the full width of the auto and as long as is the space between front and back. The upper bed 44, extends the full width of the car also, as far as the frame is concerned, but the webbing 27, thereof, extends from the side wall 40, to the center of the car, leaving a space between the end pieces 2 and the opposite side wall of the car, through which space a person can pass, to occupy the bed 44. The side rails 1, of the bed 44, are turned up to clear the doorways on both sides of the car. The end of the bed next to the front wall 42 is hung upon the frame of the car upon hooks 45 fixed thereto, which are engaged by hooks 46, fixed to the end piece 2. The lower bed 43 is also hung upon the front end of the car next to the windshield upon hooks numbered the same as those for the upper bed. The side rails 1, of the lower bed 43, are turned down to be under the full width of the webbing 27. The legs 32 of the upper bed 44 next to the rear end of the car, are bent forward to come in front of the cross piece 2 (at the rear of the car) of the lower bed 43 and turned back of the leg 32 of the lower bed 43 to rest upon the frame 47 of the rear seat. The front seats of the automobile are folded down or removed, when the beds are put in place to form the berths.

When not in use the side rails 1 of the bed are taken apart and folded, as are likewise the legs 32, against the end cross pieces 2 and then rolled up with the webbing.

As modifications of the structure herein shown and described can be made without departing from the spirit and scope of my invention, I do not wish to be confined to this particular construction, hence I claim, 1. A knock-down bed consisting of a frame, including two end cross pieces and two side members, a body support connected with said end cross pieces, and means for supporting said frame at an elevation, one of said side members being bent away from the plane of said body support, and holding ends of cross pieces in spaced relation, said last mentioned slide member comprising two longitudinal parts, means for releasably forming a rigid joint between said longitudinal parts, other means at each end of said side member for joining a longitudinal part to an end of a cross piece, said last mentioned means including a bolt fixed to said end of said cross piece, a stem fixed to said last mentioned longitudinal part, said bolt and said stem being pivoted together, whereby said longitudinal parts may be turned against their connected cross pieces, when said parts are disjointed for folding purposes.

2. A knock-down bed consisting of a frame, including end cross pieces and two side members, a body support connected with said end cross pieces and means for supporting said frame at an elevation, one of said side members comprising two longitudinal parts, means for releasably forming a rigid joint between said longitudinal parts, other means at each end of said side member for joining a longitudinal part to an end of a cross piece, said last mentioned means including a bolt fixed to said end of said cross piece, a stem fixed to said last mentioned longitudinal part, said bolt and said stem being pivoted together, whereby said longitudinal parts may be turned against their connected cross pieces when said parts are disjointed for folding purposes.

3. A knock-down bed consisting of a frame, means for supporting said frame in an elevated position, and a webbing stretched between opposite ends of said frame, said frame including two end cross pieces, two side rails and pivotal joints connecting the ends of said rails with said cross pieces, each of said joints consisting of a stem releasably engaging an end cross piece, another stem pivoted to said first mentioned stem, said latter stem being attached to said rail end to swivel therewith.

4. In combination, within the body of an automobile, two knock-down beds, each comprising two end cross pieces, a webbing connecting said cross pieces, side bars releasably spreading said end pieces, means for releasably hanging one end cross piece to the front of said body, and legs pivotally connected to the other of said cross pieces, adapted to rest upon the rear seat of said automobile, the legs of one of said beds being longer than the legs of the other bed, whereby one bed is positioned above the other at the rear, the front ends of the beds being hung one above the other.

CHARLES G. READ.